(12) United States Patent
Jiang et al.

(10) Patent No.: US 11,917,265 B2
(45) Date of Patent: Feb. 27, 2024

(54) AUGMENTED REALITY DATA DISSEMINATION METHOD, SYSTEM AND TERMINAL AND STORAGE MEDIUM

(71) Applicant: Tencent Technology (Shenzhen) Company Limited, Shenzhen (CN)

(72) Inventors: Huifu Jiang, Shenzhen (CN); Feng Xue, Shenzhen (CN); Nan Liu, Shenzhen (CN); Yifan Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 825 days.

(21) Appl. No.: 16/989,488

(22) Filed: Aug. 10, 2020

(65) Prior Publication Data

US 2020/0372687 A1 Nov. 26, 2020

Related U.S. Application Data

(63) Continuation of application No. PCT/CN2019/090071, filed on Jun. 5, 2019.

(30) Foreign Application Priority Data

Jul. 5, 2018 (CN) .......................... 201810730829.5

(51) Int. Cl.
*H04N 21/81* (2011.01)
*G06T 11/00* (2006.01)
*H04N 21/44* (2011.01)

(52) U.S. Cl.
CPC ......... *H04N 21/8146* (2013.01); *G06T 11/00* (2013.01); *G06T 2200/24* (2013.01); *H04N 21/44* (2013.01); *H04N 21/816* (2013.01)

(58) Field of Classification Search
CPC ... H04B 1/00; H04B 1/38; H04B 1/40; H04B 1/44; H04B 1/50; H04B 1/54;
(Continued)

(56) References Cited

U.S. PATENT DOCUMENTS

2011/0164832 A1 7/2011 Yoon et al.
2012/0046072 A1* 2/2012 Choi ..................... G06F 16/903
455/556.1
(Continued)

FOREIGN PATENT DOCUMENTS

CN 102281348 A 12/2011
CN 103679204 A 3/2014
(Continued)

OTHER PUBLICATIONS

Tencent Technology, ISR, PCT/CN2019/090071, Sep. 2, 2019, 2 pgs.

(Continued)

*Primary Examiner* — Kiet M Doan
(74) *Attorney, Agent, or Firm* — Morgan, Lewis & Bockius LLP

(57) ABSTRACT

This application relates to a method of processing augmented reality (AR) data at a terminal, and a storage medium, and the AR data propagation method includes: receiving AR data, the AR data carrying AR recognition data and being generated by a source terminal; displaying the AR data according to the AR recognition data; in response to receiving a user instruction, updating the AR data according to the user instruction; and sharing the updated AR data with a target terminal. With the solutions provided in this application, users can implement AR interactions with virtual world data by using a terminal with a relatively low configuration.

19 Claims, 10 Drawing Sheets

(58) Field of Classification Search
CPC ...... H04B 1/401; H04B 1/403; G01C 21/362; G01C 21/3438; G01C 21/3602; G06T 11/00; G06V 20/00; H04W 4/02; H04M 2203/359
USPC .............................. 345/419, 633; 455/414.1
See application file for complete search history.

(56) References Cited

U.S. PATENT DOCUMENTS

| | | | |
|---|---|---|---|
| 2014/0253743 A1* | 9/2014 | Loxam .................. | H04N 5/272 348/207.1 |
| 2015/0040074 A1 | 2/2015 | Hofmann et al. | |
| 2015/0109339 A1* | 4/2015 | Jin ........................ | G06V 20/20 345/633 |
| 2016/0133230 A1 | 5/2016 | Daniels et al. | |
| 2016/0265935 A1* | 9/2016 | Ma ...................... | G01C 21/1654 |

FOREIGN PATENT DOCUMENTS

| | | |
|---|---|---|
| CN | 103959220 A | 7/2014 |
| CN | 105975232 A | 9/2016 |
| CN | 107111996 A | 8/2017 |
| CN | 107395671 A | 11/2017 |
| CN | 107592575 A | 1/2018 |
| EP | 2908919 A1 | 8/2015 |

OTHER PUBLICATIONS

Extended European Search Report, EP19830742.3, dated Feb. 9, 2021, 15 pgs.
Tencent Technology, WO, PCT/CN2019/090071, Sep. 2, 2019, 3 pgs.
Tencent Technology, IPRP, PCT/CN2019/090071, Jan. 5, 2021, 4 pgs.

* cited by examiner

AUGMENTED REALITY DATA DISSEMINATION METHOD, SYSTEM AND TERMINAL AND STORAGE MEDIUM

CROSS REFERENCE TO RELATED APPLICATIONS

This application is a continuation application of PCT Patent Application No. PCT/CN2019/090071, entitled "AUGMENTED REALITY DATA DISSEMINATION METHOD, SYSTEM AND TERMINAL AND STORAGE MEDIUM" filed on Jun. 5, 2019, which claims priority to Chinese Patent Application No. 201810730829.5, entitled "AUGMENTED REALITY DATA PROPAGATION METHOD AND SYSTEM, AND STORAGE MEDIUM" filed on Jul. 5, 2018, all of which are incorporated by reference in their entirety.

FIELD OF THE TECHNOLOGY

This application relates to the field of computer technologies, and in particular, to an augmented reality data propagation method and system, a terminal, and a storage medium.

BACKGROUND OF THE DISCLOSURE

With the development of computer technologies, an augmented reality (AR) technology has been generated and developed. The AR technology can not only display real world information to users, but also display virtual world data of a virtual world to users. Information of the two worlds complements each other and by overlaying the information of the two worlds, interactions between users and the virtual world data displayed in a real world can be increased.

However, the current AR technology has high requirements on a configuration of a terminal, and the terminal needs to be provided with a camera and have a recognition capability. Therefore, some terminals with a relatively low configuration cannot apply the AR technology, and users cannot implement interactions with the virtual world data by using the terminals with the relatively low configuration.

SUMMARY

Based on this, embodiments of this application provide an augmented reality (AR) data propagation method and system, a terminal, and a storage medium, to implement interactions between users and virtual world data by using a terminal with a relatively low configuration. The technical solutions are as follows:

According to an aspect, a method of processing augmented reality (AR) data is performed at a terminal having a processor and memory storing a plurality of programs to be executed by the processor, the method comprising:
  receiving AR data, the AR data carrying AR recognition data and being generated by an acquisition terminal;
  displaying the AR data according to the AR recognition data;
  in response to receiving a user instruction, updating the AR data according to the user instruction; and
  sharing the updated AR data with a target terminal.

According to an aspect, an AR data propagation system is provided, including an acquisition terminal, a first target terminal, a second target terminal, and a third target terminal, the acquisition terminal being configured to acquire a reality scenario image, recognize AR recognition data according to the reality scenario image, obtain virtual world data corresponding to the AR recognition data, and generate AR data according to the reality scenario image, the AR recognition data, and the virtual world data;

the acquisition terminal being further configured to propagate the AR data to the first target terminal;

the first target terminal being configured to receive the AR data and further configured to transmit the AR data to the second target terminal;

the second target terminal being configured to display, in response to receiving the AR data transmitted by the first target terminal, the AR data according to the AR recognition data; and the second target terminal being further configured to receive a user instruction, update the AR data according to the user instruction, and share the updated AR data to the third target terminal.

According to an aspect, a terminal is provided, including a processor and a memory, the memory storing at least one instruction, and the instruction being loaded and executed by the processor to implement the aforementioned method of processing augmented reality (AR) data.

According to an aspect, a non-transitory computer-readable storage medium is provided, storing a plurality of computer programs, and the computer programs, when executed by a processor of a terminal, causing the terminal to perform the operations performed in the aforementioned AR data propagation method.

DESCRIPTION OF EMBODIMENTS

To make the objectives, technical solutions, and advantages of this application clearer and more comprehensible, the following further describes this application in detail with reference to the accompanying drawings and the embodiments. It is to be understood that the specific embodiments described herein are only used for describing this application, but are not intended to limit this application.

Figure 1:
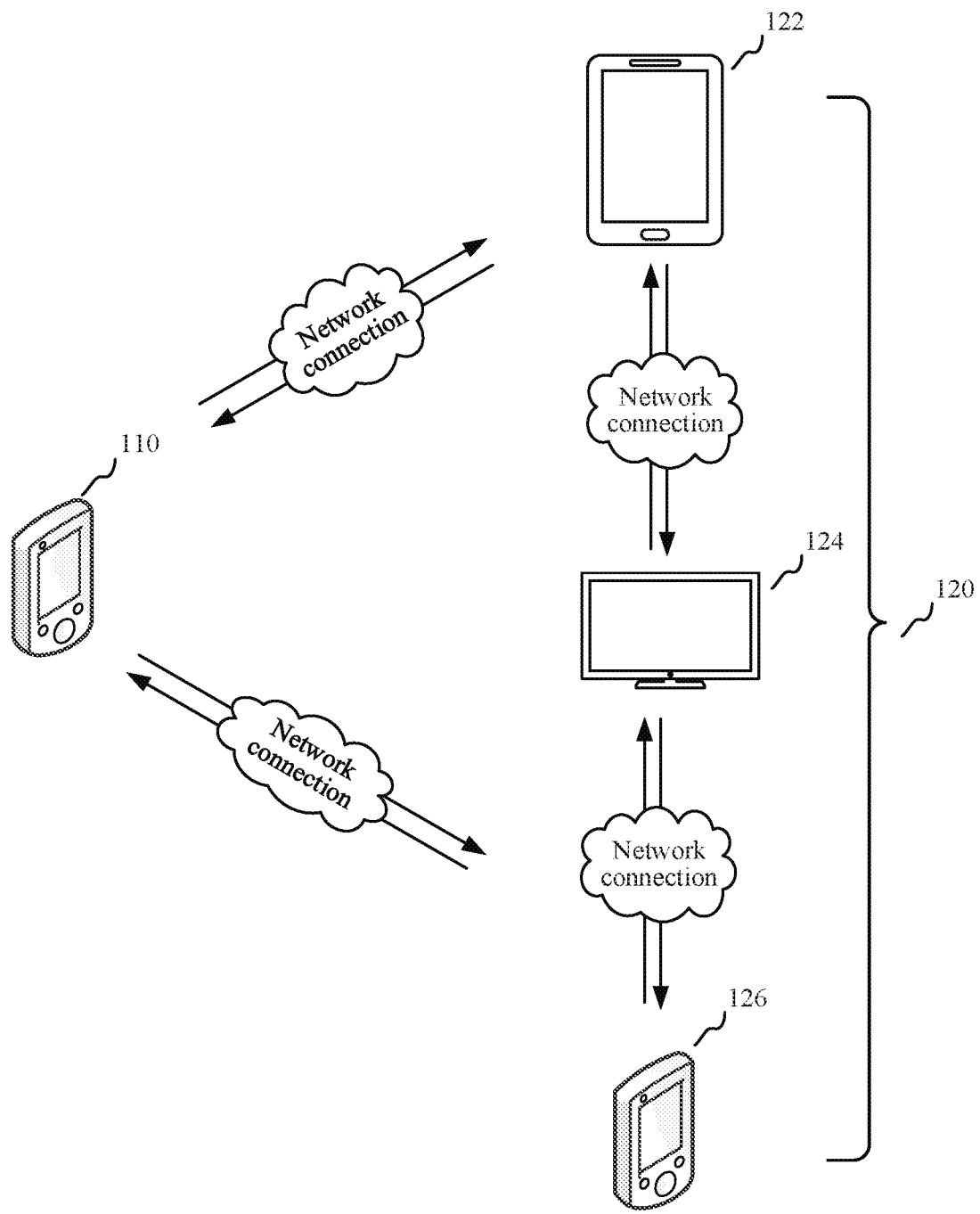
FIG. 1 is a diagram of an application environment of an augmented reality (AR) data propagation method according to an embodiment.

FIG. 1 is a diagram of an application environment of an augmented reality (AR) data propagation method according to an embodiment. Referring to FIG. 1, the AR data propagation method is applied to an AR data propagation system. The AR data propagation system includes an acquisition terminal 110 and a target terminal 120, and the target terminal 120 may include one or more target terminals, for example, a first target terminal 122, a second target terminal 124, or a third target terminal 126. The acquisition terminal 110 is connected to the target terminal 120 through a network. The acquisition terminal 110 may be specifically a mobile terminal, and the mobile terminal may be specifically at least one of a mobile phone, a tablet computer, a notebook computer, or the like, or may be smart glasses, perspective glasses, or the like. The target terminal 120 may be specifically a mobile terminal, and the mobile terminal may be specifically at least one of a mobile phone, a tablet computer, a notebook computer, or the like.

For example, in a multi-user interactive AR data propagation system, if the target terminal 120 is not provided with an image acquisition device and has no AR recognition capability, in the related art, the target terminal 120 cannot experience an AR scenario. However, in the AR data propagation method provided in the embodiments of this application, AR data may be acquired first by the acquisition terminal 110 provided with the image acquisition device and having the AR recognition capability, and the acquisition terminal 110 sends the acquired AR data to any target terminal 120 (for example, the first target terminal 122, the second target terminal 124, or the third target terminal 126), so that the target terminal 120 (regardless of whether the target terminal 120 is provided with the image acquisition device and has the AR recognition capability) can display the AR data. Further, if the target terminal 120 has relatively low performance, the target terminal 120 may be caused to observe virtual world data in the AR data from the perspective of the acquisition terminal 110 after displaying the AR data, and if the target terminal 120 has relatively high performance, the target terminal 120 further supports secondary modification (that is, updating) on the received AR data, and propagating the updated AR data to other target terminals (or acquisition terminals). The following describes the embodiments of this application in detail.

Figure 2:
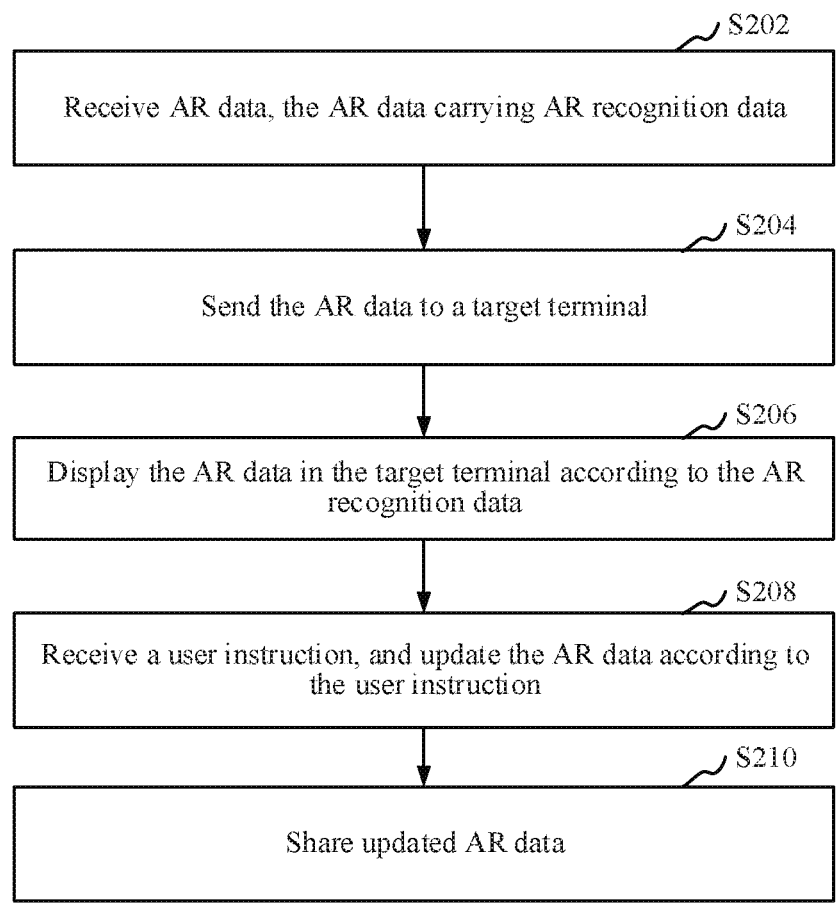
FIG. 2 is a schematic flowchart of an AR data propagation method according to an embodiment.

As shown in FIG. 2, in an embodiment, an AR data propagation method is provided. In this embodiment, the method being applied to the target terminal 120 in FIG. 1 is mainly used as an example for description. Referring to FIG. 2, the AR data propagation method specifically includes the following steps:

S202. The target terminal receives AR data, the AR data carrying AR recognition data.

Specifically, the target terminal may receive, through a network, AR data propagated by an acquisition terminal. The AR data is data generated in a process of implementing an AR picture. The AR data includes an acquired reality scenario image, recognized AR recognition data, and virtual world data related to a virtual world.

The AR recognition data is used for understanding information about a reality scenario. The AR recognition data in the AR data is recognized by the acquisition terminal. Each time one frame of reality scenario image is acquired, the acquisition terminal records recognized AR recognition data and virtual world data that correspond to a current reality scenario image, and generates AR data corresponding to the frame of reality scenario image according to the AR recognition data and the virtual world data.

Specifically, in the process of acquiring a reality scenario image, the acquisition terminal further tracks a movement of a sight of a camera by using a sensor, analyzes and reconstructs the acquired reality scenario image, and recognizes a reality scenario with reference to sensor data, to obtain the AR recognition data used for understanding the reality scenario. The acquisition terminal may find, according to the recognized AR recognition data, a target that needs to be "augmented" and a location of the target in the reality scenario, and may overlay corresponding virtual world data on the target in the acquired reality scenario image, to implement virtuality and reality combination, thereby achieving the objective of AR. In an embodiment, the sensor configured on the acquisition terminal may include at least one of a gyroscope, a tilt sensor, a displacement sensor, a speed sensor, an acceleration sensor, or the like.

Figure 3:
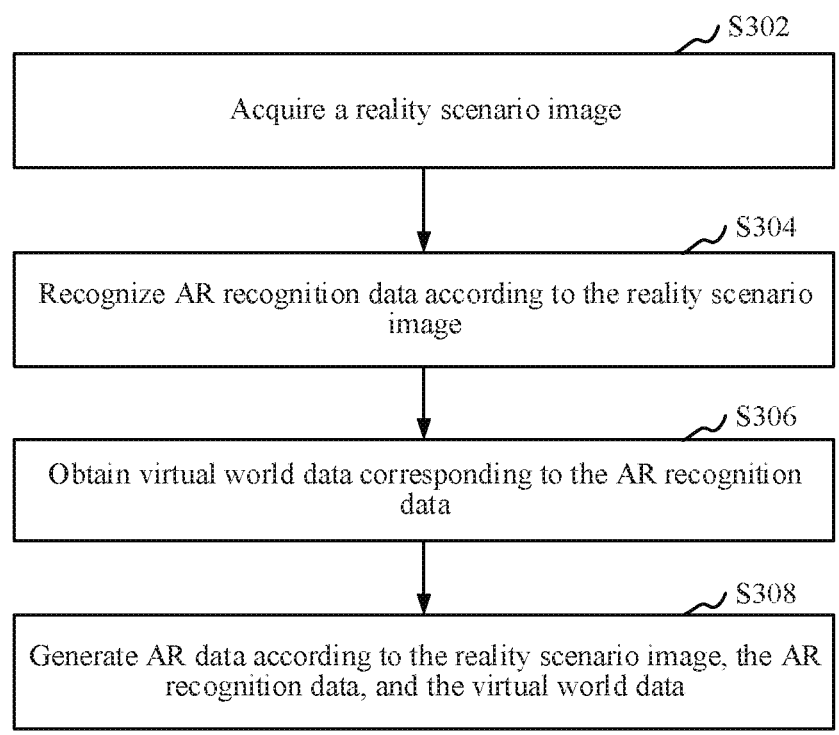
FIG. 3 is a schematic flowchart of a step of generating AR data according to an embodiment.

In an embodiment, as shown in FIG. 3, a step of generating AR data specifically includes the following steps. The step of generating AR data may be implemented on an acquisition terminal provided with an image acquisition device and having an AR recognition capability, or may be implemented by a target terminal provided with an image acquisition device and having an AR recognition capability. In this embodiment, the method for generating the AR data being implemented on an acquisition terminal is used for description.

S302. The acquisition terminal acquires a reality scenario image.

The reality scenario image is an image used for expressing a reality scenario in which the acquisition terminal is currently located. Specifically, the acquisition terminal may acquire the reality scenario image by using a built-in camera, and the built-in camera includes a front-facing camera or a rear-facing camera. Alternatively, the acquisition terminal may acquire the reality scenario image by using an external image acquisition device, for example, the image acquisition device may be a camera.

In a specific application scenario, a user may turn on the built-in camera by using an application used for invoking cameras on the acquisition terminal. In this way, the acquisition terminal may acquire an image within a shooting range of the camera as the reality scenario image. It may be understood that, if the user turns on the front-facing camera, the acquired image may include a background within a shooting range of the front-facing camera. If the user turns on the rear-facing camera, the acquired image may include a background within a shooting range of the rear-facing camera.

In an embodiment, the AR data propagation method may be applied to an AR application, for example, an AR game application. The acquisition terminal may automatically turns on a camera after detecting that the AR application is started, and uses a reality scenario redisplayed by a reality scenario image captured by the camera in real time as a usage scenario of the AR application.

S304. The acquisition terminal recognizes AR recognition data according to the reality scenario image.

In an embodiment, the acquisition terminal may send the acquired reality scenario image and the obtained sensor data to a server, so that the server analyzes and reconstructs the acquired reality scenario image and the obtained sensor data, analyzes a relative position of virtual world data and a reality scenario, implements alignment of a coordinate system, and performs fusion calculation on a virtual scenario, to obtain the AR recognition data.

In an embodiment, each time the acquisition terminal acquires one frame of reality scenario image, the acquisition terminal records AR recognition data recognized from the current reality scenario image until image acquisition is completed. The AR recognition data includes at least one of simultaneously localization and mapping (SLAM) information, positioning map information, plane information, light sensing information, or facial information. The acquisition terminal may obtain the positioning map information, construct a corresponding map, and determine a movement trajectory of the acquisition terminal in the constructed map according to the movement trajectory, direction information, rotation angle information, or the like during movement.

S306. The acquisition terminal obtains virtual world data corresponding to the AR recognition data.

The virtual world data is content that is preset and needs to be overlaid on the acquired reality scenario image. The virtual world data may include a virtual character and attribute information related to the virtual character, for example, the virtual character may be a virtual person or a virtual animal, and the related attribute information may be identity description information, level information, and prop information of the virtual character. Optionally, the virtual world data may further include a virtual item, for example, a virtual scenery, a virtual prop, and a virtual sign.

Specifically, after recognizing the AR recognition data, the acquisition terminal may obtain virtual world data corresponding to the AR recognition data, and overlay the obtained virtual world data on a target location in the reality scenario image, to overlay the virtual world data on a reality scenario captured in real time, thereby augmenting the reality scenario.

In an embodiment, the acquisition terminal may create several pieces of virtual world data in advance, and store the created virtual world data in a file or a cache, to obtain the created virtual world data when needed. Alternatively, the acquisition terminal may obtain virtual world data corresponding to the recognized AR recognition data from a server. The server may implement modeling, management, and drawing of virtual world data, and correspondingly store the created virtual world data and a target identifier of a to-be-augmented target in a reality scenario. In this way, after recognizing the to-be-augmented target in the AR recognition data according to the acquired image, the acquisition terminal may obtain virtual world data corresponding to the target identifier of the to-be-augmented target.

In an embodiment, when recognizing that AR recognition data includes a preset target from a reality scenario image captured in real time, the acquisition terminal obtains virtual world data corresponding to the preset target, and displays the corresponding virtual world data in a reality scenario redisplayed by the reality scenario image. The preset target may be a human face, a preset gesture, a preset expression, a preset action, or the like.

For example, the acquisition terminal recognizes that the preset target is a desk from an acquired reality scenario image and obtains corresponding virtual world data "virtual cup". If the "virtual cup" needs to be placed on the desk recognized from the reality scenario image, it needs to be known where the desk is in the acquired reality scenario image. Each time the acquisition terminal obtains a new frame of reality scenario image, the acquisition terminal needs to position the desk in the image based on the acquired reality scenario image and the sensor data. Specifically, the acquisition terminal may determine a location of the desk in a preset coordinate system, virtually place the "virtual cup" on the desk according to the location, and display the desk and the "virtual cup" after being fused to a user.

In an embodiment, the acquisition terminal may alternatively display an obtained AR image according to the recognized AR recognition data after overlaying virtual world data on a reality scenario image. Further, as the acquisition terminal moves, a location of the preset target in the reality scenario image moves accordingly, and the acquisition terminal may track a movement of the preset target in the image and move displayed virtual world data together. For example, in the foregoing example, due to the movement or shaking of the acquisition terminal, the location of the captured desk displayed on a screen may change, and the corresponding "virtual cup" is also moved together.

In an embodiment, the acquisition terminal may further obtain a plurality of pieces of virtual world data corresponding to recognized AR recognition data, display the obtained plurality of pieces of virtual world data on a screen, obtain a selection instruction triggered by a user for any of the displayed virtual world data, overlay the virtual world data corresponding to the selection instruction on a target location in an acquired reality scenario image, and display an overlaid fused AR image on the screen, thereby implementing an interaction between the user and a virtual world. The acquisition terminal may further display attribute information related to the preset target when displaying the virtual world data corresponding to the preset target. Alternatively, the acquisition terminal may detect a trigger operation of a user for the displayed virtual world data and may replace, modify, or delete the displayed virtual world data according to the trigger operation. The trigger operation may be a touch operation, a click operation, or the like.

S308. The acquisition terminal generates AR data according to the reality scenario image, the AR recognition data, and the virtual world data.

In an embodiment, in a case that the reality scenario image includes video frames in a video frame sequence, the AR data is AR stream data, and the AR stream data includes the video frame sequence and further includes AR recognition data corresponding to the video frames in the video frame sequence and virtual world data corresponding to the corresponding AR recognition data.

Specifically, in a process of recording an AR video by the acquisition terminal, the acquisition terminal may recognize, according to acquired video frames, AR recognition data corresponding to a scenario in which the acquisition terminal is currently located, record the recognized AR recognition data frame by frame according to an acquisition time sequence of the video frames, and when the AR video is recorded completely, generate AR stream data according to an acquired video frame sequence, the AR recognition data corresponding to the video frames in the video frame sequence, and corresponding virtual world data.

In an embodiment, when the reality scenario image includes the video frames in the video frame sequence, step S302 of that the acquisition terminal acquires a reality scenario image includes that: the acquisition terminal acquires video frames from a reality scenario frame by frame and forms the video frames into a video frame sequence according to an acquisition time sequence. Step S304 of that the acquisition terminal recognizes AR recognition data according to the reality scenario image includes that: the acquisition terminal acquires the corresponding AR recognition data according to the video frames in the video frame sequence. Step S308 of that the acquisition terminal generates AR data according to the reality scenario image, the AR recognition data, and the virtual world data includes that: the acquisition terminal compresses the video frame sequence, the AR recognition data, and the virtual world data, to obtain AR stream data. The AR stream data may also be referred to as an AR video.

Figure 4:
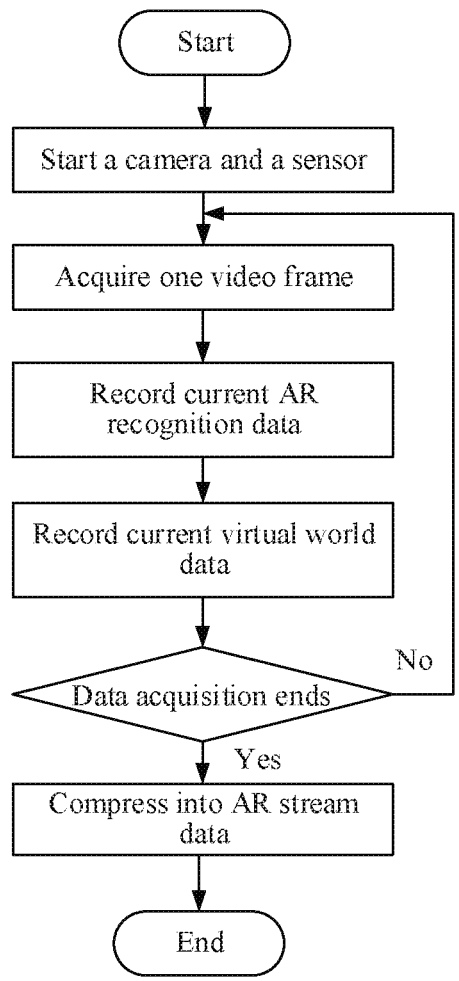
FIG. 4 is a schematic flowchart of generating an AR video according to an embodiment.

FIG. 4 is a schematic flowchart of generating an AR video according to an embodiment. Referring to FIG. 4, after starting a camera and a sensor, the acquisition terminal starts to acquire video frames. Each time the acquisition terminal acquires one video frame, the acquisition terminal obtains AR recognition data recognized based on the video frame acquired at a current moment and sensor data of the current moment and records the AR recognition data, and further records virtual world data that is obtained at the current moment and corresponds to the acquired video frame, until when the video frames are acquired completely, the acquisition terminal may compress a video frame sequence formed according to the acquired video frames, the obtained AR recognition data, and the virtual world data, to generate AR stream data.

In an embodiment, the AR stream data may be propagated or stored in a format of a compressed file, and a specific compression format may be zip, rar, or the like and is not limited.

In an embodiment, in a case that the reality scenario image is a reality scenario picture, the AR data is a picture; and step S302 of that the acquisition terminal acquires a reality scenario image includes that: the acquisition terminal obtains an image acquisition instruction, the acquisition terminal acquires an image of a reality scenario in real time according to the image acquisition instruction, the acquisition terminal recognizes AR recognition data according to the image, and the acquisition terminal acquires the reality scenario image in a case that the recognized AR recognition data meets a preset condition.

In a case that the reality scenario image is the reality scenario picture, the AR data is the picture, that is, an AR picture is obtained. That the recognized AR recognition data meets a preset condition means that the AR recognition data obtained by the acquisition terminal is sufficient to allow a target terminal to determine a location of a to-be-augmented target in an acquired image according to the AR recognition data in the AR data. In an embodiment, after obtaining the image acquisition instruction, the acquisition terminal may start countdown of the image acquisition. The set countdown duration may ensure that the AR recognition data that meets the preset condition is obtained. After the countdown ends, the reality scenario image is acquired.

In a specific application scenario, the acquisition terminal obtains an image acquisition instruction inputted by a user, starts a camera and a sensor, acquires an image of a reality scenario in real time by using the camera, and recognizes AR recognition data according to the acquired image. An image of a current moment is used as an acquired picture after the obtained AR recognition data is sufficient.

In an embodiment, in a case that the reality scenario image is a reality scenario picture, the AR data is a picture; and step S308 of generating AR data according to the reality scenario image, the AR recognition data, and the virtual world data includes: adding the AR recognition data and the virtual world data to additional information of the reality scenario picture, to obtain the AR data.

The additional information is information used for expressing a related attribute of the picture. The picture may carry the additional information, and the additional information may include picture size information, shooting time information, picture direction information, or the like of the picture. In an embodiment, the additional information may be included in a file header of the picture.

Specifically, the acquisition terminal may also propagate a shot picture to the target terminal. Before shooting, the acquisition terminal may recognize AR recognition data according to an image captured by the camera, obtain virtual world data corresponding to the recognized AR recognition data, and add the recognized AR recognition data and the obtained virtual world data to additional information of an acquired picture, to obtain AR data. In an embodiment, the acquisition terminal may alternatively overlay the obtained virtual world data on an acquired reality scenario picture for display. In this embodiment, the AR data generated according to the picture may also be referred to as an AR picture.

In an embodiment, the acquisition terminal may further compress the recognized AR recognition data, the corresponding virtual world data, and the acquired picture to form an AR data packet, and propagate the formed AR data packet to the target terminal.

Figure 5:
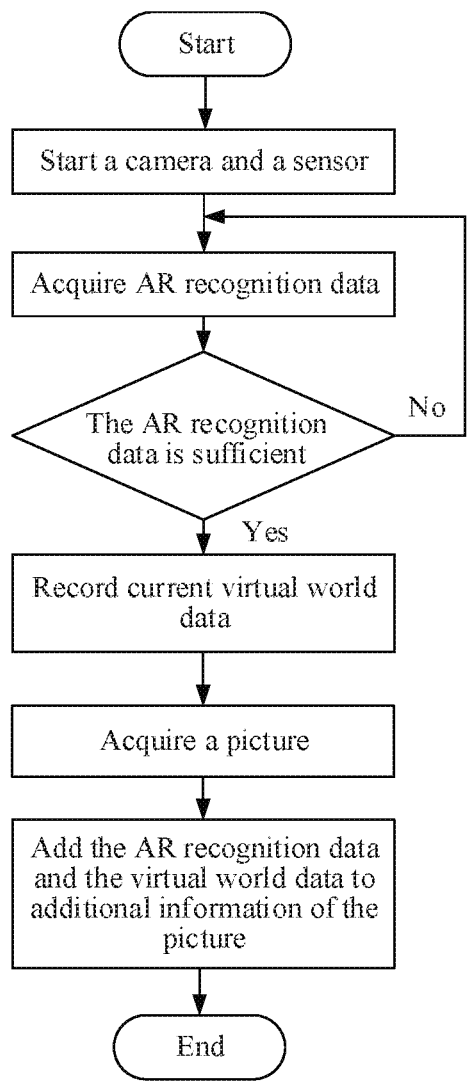
FIG. 5 is a schematic flowchart of generating an AR picture according to an embodiment.

FIG. 5 is a schematic flowchart of generating an AR picture according to an acquired reality scenario picture according to an embodiment. Referring to FIG. 5, after starting a camera and a sensor, the acquisition terminal recognizes AR recognition data according to a captured reality scenario image, until when the obtained AR recognition data is sufficient, the acquisition terminal obtains corresponding virtual world data and shoots a picture, and adds the AR recognition data and the corresponding virtual world data obtained during the shooting of the picture to additional information of the picture, to obtain an AR picture.

In this embodiment, the acquisition terminal stores the recognized AR recognition data and the obtained virtual world data in the additional information of the picture, thereby implementing propagation or storage of the AR recognition data.

S204. A target terminal transmits the AR data to another target terminal.

Specifically, the target terminal may receive, through a network, AR data sent by the acquisition terminal, and the target terminal may also send the received AR data to another target terminal. There may be a plurality of target terminals herein. AR data and updated AR data may be propagated between the target terminals. For example, as shown in FIG. 1, after generating AR data, an acquisition terminal 110 held by a user A may send the AR data to a first target terminal 122 held by a user B and a second target terminal 124 held by a user C. After receiving the AR data, the first target terminal 122 may send the AR data to the second target terminal 124 or the acquisition terminal 110, or the first target terminal 122 may send the AR data updated by the user B to the second target terminal 124 or the acquisition terminal 110. The second target terminal 124 may further share the AR data updated by the user C to a third target terminal 126.

In an embodiment, the first target terminal receiving the AR data may send AR stream data to another target terminal, for example, the second target terminal. When playing video frames in a video frame sequence in the AR stream data according to an order of the video frame sequence, the second target terminal may overlay, according to corresponding AR recognition data, corresponding virtual world data on the corresponding video frames for play.

Optionally, for any target terminal (including the first target terminal), when any AR data is received, the step of overlaying the corresponding virtual world data on the corresponding video frame for play when the video frames in the video frame sequence in the AR stream data are played in the order of the video frame sequence according to the corresponding AR recognition data may be performed. The entity performing the above step is not specifically limited herein.

Figure 6:
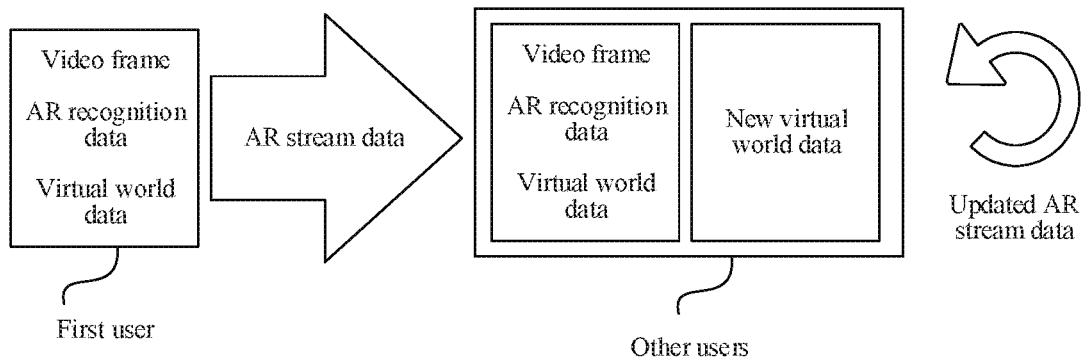
FIG. 6 is a schematic diagram of propagating an AR video according to an embodiment.

FIG. 6 is a schematic diagram of propagating an AR video according to an embodiment. Referring to FIG. 6, an acquisition terminal held by the first user has a recognition capability. After video frames are acquired, corresponding AR recognition data and virtual world data are obtained, and AR stream data is generated according to the AR recognition data and the virtual world data. The first user propagates the AR stream data to target terminals of other users by using the acquisition terminal, and the target terminals of the other users do not need to have the recognition capability, and only need to restore an AR scenario image of the first user frame by frame according to the received AR stream data and display the AR scenario image. Because the AR scenario image of the first user is restored, the other users may experience the AR scenario from the perspective of the first user. Any one of the target terminals of the other users may further obtain updated virtual world-related data for AR, thereby achieving the objective of transforming an AR video.

Figure 7:
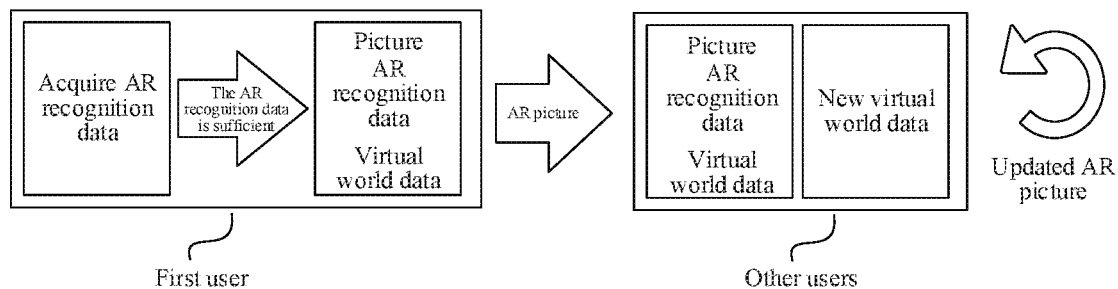
FIG. 7 is a schematic diagram of propagating an AR picture according to an embodiment.

FIG. 7 is a schematic diagram of propagating an AR picture according to an embodiment. Referring to FIG. 7, an acquisition terminal held by the first user has a recognition capability. Before shooting a picture, the acquisition terminal needs to capture a reality scenario image by moving a camera, to recognize sufficient AR recognition data. After obtaining sufficient AR recognition data, the acquisition terminal may shoot the picture by using the camera, store the recognized AR recognition data and obtained virtual world data in additional information of the shot picture to obtain an AR picture, and propagate the AR picture to target terminals of other users. The target terminals of the other users do not need to have the recognition capability and only need to restore an AR scenario according to the received AR picture. Because the AR scenario in the picture is restored, the other users may place other virtual world data on a plane of the picture, thereby achieving the objective of transforming an AR picture.

S206. Display the AR data in the target terminal according to the AR recognition data.

In an embodiment, the acquisition terminal may be a terminal having a capability of recognizing AR recognition data according to an acquired reality scenario image, and the AR recognition data is information required for AR processing. The target terminal may be a terminal that does not have the capability of recognizing the AR recognition data according to the acquired reality scenario image, and the target terminal only needs to extract the reality scenario image, the AR recognition data, and virtual world data from the received AR data, and overlay the virtual world data on the reality scenario image according to the AR recognition data, to restore and display an AR scenario acquired by the acquisition terminal. Although the target terminal does not have the recognition capability, the target terminal can play the AR scenario image.

The target terminal may be the "target terminal" in S204, or may be the "another target terminal" in S204. Whether the target terminal is specifically a sender or a receiver is not limited in this embodiment of this application.

Figure 8:
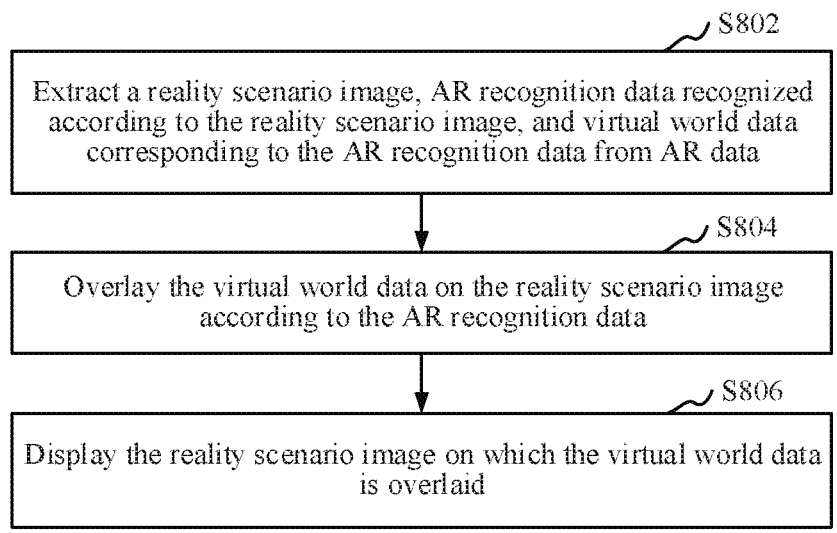
FIG. 8 is a schematic flowchart of a step of displaying AR data in a target terminal according to AR recognition data according to an embodiment.

In an embodiment, as shown in FIG. 8, step S206 of displaying the AR data in the target terminal according to the AR recognition data specifically includes the following steps:

S802. The target terminal extracts a reality scenario image, AR recognition data recognized according to the reality scenario image, and virtual world data corresponding to the AR recognition data from the AR data.

Specifically, after receiving AR data propagated locally, the target terminal may extract a reality scenario image, AR recognition data, and corresponding virtual world data from the AR data. In an embodiment, the acquisition terminal may encode an acquired reality scenario image, recognized AR recognition data, and obtained virtual world data according to a preset data format and save the acquired reality scenario image, the recognized AR recognition data, and the obtained virtual world data, and the target terminal may perform decoding according to an agreed data format to extract the reality scenario image, the AR recognition data, and the corresponding virtual world data.

In an embodiment, in a case that the AR data is AR stream data, step S802 of that the target terminal extracts a reality scenario image, AR recognition data recognized according to the reality scenario image, and virtual world data corresponding to the AR recognition data from the AR data includes that: the target terminal extracts video frames including the reality scenario image according to a video frame time sequence from the video frame sequence in the AR stream data, and the target terminal extracts AR recognition data and virtual world data that correspond to the video frames from the AR stream data, the AR recognition data corresponding to the virtual world data.

The AR stream data is data generated by the acquisition terminal according to the video frames in the video frame sequence and the AR recognition data and the virtual world data that correspond to the video frames when the reality scenario image is the video frames in the video frame sequence. Specifically, the acquisition terminal acquires video frames from a reality scenario frame by frame, forms the video frames into a video frame sequence according to an acquisition time sequence, recognizes corresponding AR recognition data according to the video frames in the video frame sequence, and compresses the video frame sequence, the AR recognition data, and virtual world data, to obtain the AR stream data.

Correspondingly, after receiving the AR stream data propagated locally, the target terminal may decompress the AR stream data, and obtain the corresponding video frames sequentially according to an order of the video frames in the video frame sequence. Each time one video frame is obtained, the target terminal extracts, according to a correspondence among the video frames and the AR recognition data and the virtual world data, AR recognition data and virtual world data that correspond to the current video frame from the AR stream data.

In an embodiment, in a case that the AR data is a picture, step S802 of that the target terminal extracts a reality scenario image, AR recognition data recognized according to the reality scenario image, and virtual world data corresponding to the AR recognition data from the AR data includes that: the target terminal obtains image data from the picture, to obtain the reality scenario image, and the target terminal extracts the AR recognition data recognized according to the reality scenario image and the virtual world data corresponding to the AR recognition data from additional information of the picture.

The additional information of the picture is information used for expressing a related attribute of the picture. The picture may carry the additional information, and the additional information may include picture size information, shooting time information, picture direction information, and the like of the picture. In an embodiment, the additional information may be included in a file header of the picture. The acquisition terminal may add AR recognition data recognized according to an acquired reality scenario image and virtual world data corresponding to the AR recognition data to the additional information of the picture, to obtain the AR data.

Correspondingly, after receiving the AR picture propagated locally, the target terminal may obtain picture data from the picture, for example, pixel data of the picture, to obtain the reality scenario image acquired by the acquisition terminal. The target terminal may further extract the AR recognition data recognized by the acquisition terminal according to the acquired picture and the obtained virtual world data from the additional information of the picture. The target terminal does not need to have a recognition capability and only needs to restore an AR scenario according to the received AR picture.

S804. The target terminal overlays the virtual world data on the reality scenario image according to the AR recognition data.

The AR recognition data is information required by AR processing. The target terminal may be a terminal that does not have a capability of recognizing AR recognition data according to an acquired reality scenario image, and the target terminal only needs to extract the reality scenario image, the AR recognition data, and the virtual world data from the received AR data, and overlay the virtual world data on the reality scenario image according to the AR recognition data, to restore and display an AR scenario acquired by the acquisition terminal. Although the target terminal does not have the recognition capability, the target terminal can play the AR scenario image.

Specifically, the target terminal determines, according to obtained AR recognition data, a preset target that needs to be "augmented" and a location of the preset target in an obtained reality scenario image, and may overlay corresponding obtained virtual world data on the preset target in the reality scenario image, to implement virtuality and reality combination, thereby achieving the objective of AR.

It may be understood that although the target terminal does not have the recognition capability, and even does not have the image acquisition capability, for example, does not need to turn on a camera, the target terminal may still construct an AR scenario according to the obtained AR recognition data, and overlay the virtual world data on the reality scenario image, so that a user can experience the AR scenario by using a terminal with a relatively low configuration. The preset target may be a human face, a preset gesture, a preset expression, a preset action, and the like.

S806. The target terminal displays the reality scenario image on which the virtual world data is overlaid.

Specifically, after determining the location of the preset target in the reality scenario image according to the AR recognition data in the AR data, the target terminal may overlay the extracted virtual world data on the determined location, and render and display the reality scenario image on which the virtual world data is overlaid.

In an embodiment, in a case that the AR data is AR stream data, step S804 of overlaying the virtual world data on the reality scenario image according to the AR recognition data includes the following step: overlaying the virtual world data corresponding to the extracted video frames on the extracted video frames according to the AR recognition data corresponding to the extracted video frames; step S806 of displaying the reality scenario image on which the virtual world data is overlaid includes the following step: playing, according to the video frame time sequence, the video frames on which the virtual world data is overlaid.

Specifically, in a case that the AR data is AR stream data, that is, an AR video, after receiving the AR stream data, the target terminal may decompress the AR stream data to obtain a video frame sequence, and AR recognition data and virtual world data that correspond to video frames in the video frame sequence, and the target terminal may sequentially play the video frames according to an order of the video frames in the video frame sequence, when playing a current video frame, overlay the corresponding virtual world data in the current video frame, and play, according to the time sequence of the video frames in the original video frame sequence, the video frames on which the virtual world data is overlaid.

In an embodiment, in a case that the AR data is a picture, step S804 of overlaying the virtual world data on the reality scenario image according to the AR recognition data includes the following step: overlaying, according to the AR recognition data extracted from the additional information of the picture, virtual world data corresponding to the extracted AR recognition data on the picture, and step S806 of displaying the reality scenario image on which the virtual world data is overlaid includes the following step: displaying the picture on which the virtual world data is overlaid.

In the foregoing embodiment, after receiving the AR data, the target terminal may extract the reality scenario image, the AR recognition data, and the corresponding virtual world data, overlay the virtual world data on the reality scenario image, and display the reality scenario image on which the virtual world data is overlaid. Even if the configuration of the target terminal is relatively low, an AR scenario acquired by a terminal with a relatively high configuration can be restored, so that a user can interact with the virtual world data by using a terminal with a relatively low configuration.

S208. The target terminal updates, in response to receiving a user instruction, the AR data according to the user instruction.

The user instruction is an instruction used for updating displayed virtual world data. Specifically, the target terminal receiving the AR data may further perform secondary processing on the restored AR scenario, and the target terminal may detect the user instruction for updating the displayed virtual world data such as a user instruction for adding, modifying, deleting, or replacing the virtual world data, and after obtaining updated virtual world data, display the updated virtual world data.

For example, the target terminal may obtain virtual world data matching AR recognition data in the AR data, and display the virtual world data to a user through a screen. When receiving a user instruction triggered by a user for any displayed virtual world data, the target terminal obtains virtual world data corresponding to the user instruction, replaces original virtual world data with the virtual world data, overlays the virtual world data on a target location of an acquired reality scenario image, and displays an overlaid fused AR image on the screen to update the virtual world data.

In an embodiment, step S208 of receiving a user instruction, and updating the AR data according to the user instruction includes the following steps: obtaining the user instruction triggered by a user for updating displayed virtual world data; obtaining updated virtual world data corresponding to the user instruction; and generating updated AR data according to the updated virtual world data, the reality scenario image, and the AR recognition data.

Specifically, the target terminal may further obtain new virtual world data to update the virtual world data extracted from the AR data to obtain updated virtual world data, and generate updated AR data according to the updated virtual world data, the extracted reality scenario image, and the AR recognition data.

In an embodiment, in a case that the AR data is AR stream data, after receiving the AR stream data, the target terminal decompresses the AR stream data to obtain a video frame sequence, and AR recognition data and virtual world data that correspond to video frames in the video frame sequence. The target terminal may sequentially play the video frames according to an order of the video frames in the video frame sequence. When playing a current video frame, the target terminal may obtain an instruction triggered by a user for updating displayed virtual world data, and display updated virtual world data. A user can not only experience an AR scenario, but also update the virtual world data at the will of the user, thereby achieving the objective of secondary transformation of the AR video.

The target terminal may further obtain a recording instruction for recording the AR stream data for the updated virtual world data, and generate, according to the recording instruction, updated AR data corresponding to a currently played video frame by using currently updated virtual world data, the currently played video frame, and corresponding AR recognition data until the video play ends.

Figure 9:
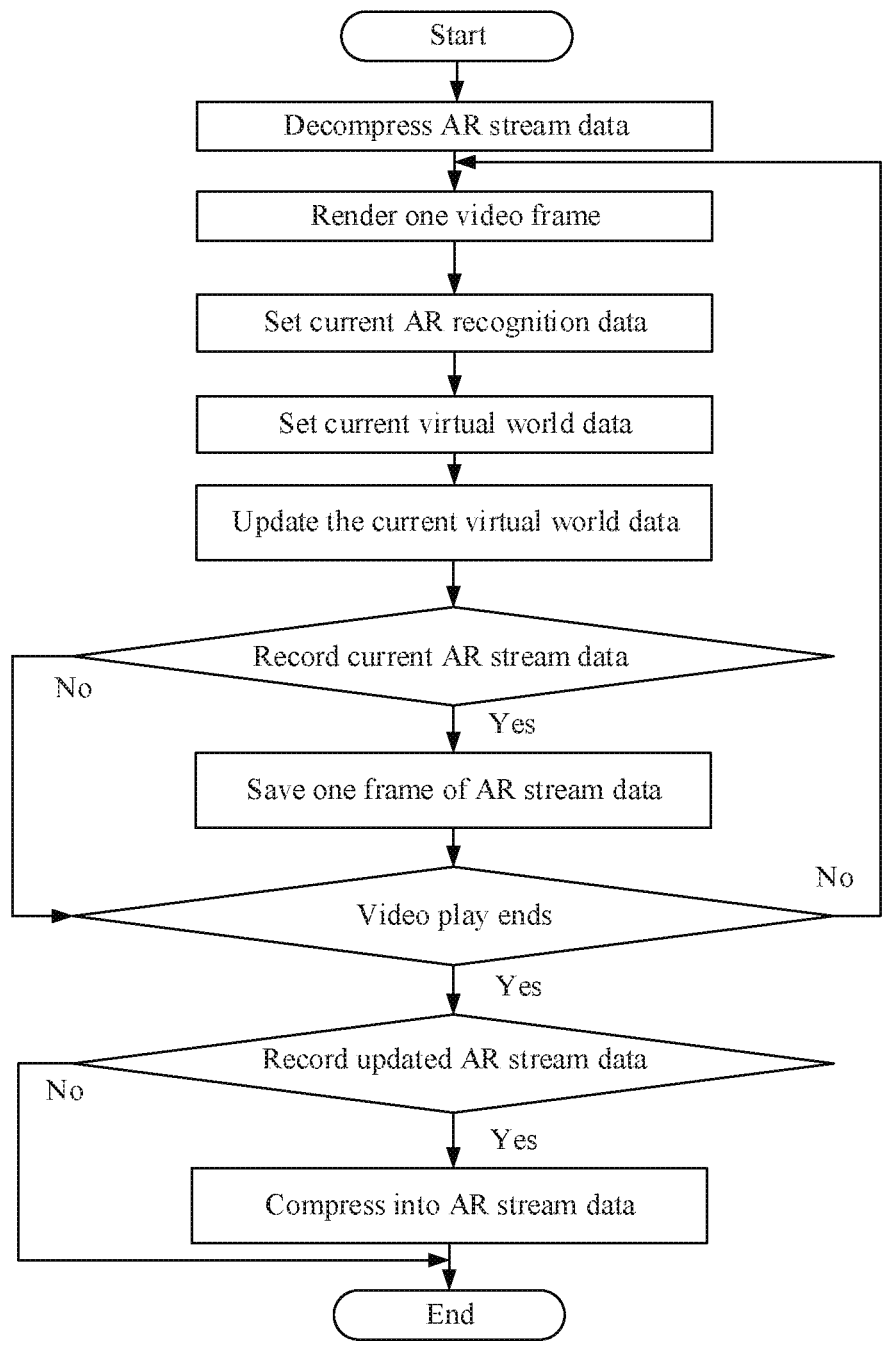
FIG. 9 is a schematic flowchart of restoring and transforming an AR scenario according to an embodiment.

FIG. 9 is a schematic flowchart of restoring and transforming an AR scenario according to an embodiment. Referring to FIG. 9, the target terminal decompresses received AR stream data to obtain a video frame sequence, corresponding AR recognition data, and virtual world data corresponding to the AR recognition data. When rendering each video frame, the target terminal may render corresponding virtual world data according to AR recognition data corresponding to the currently rendered video frame, and the target terminal may further update and display the current virtual world data according to a triggering instruction of a user. If the target terminal also receives a recording instruction triggered by the user, the target terminal records AR stream data corresponding to a currently played video frame according to currently updated virtual world data, the currently played video frame, and corresponding AR recognition data until the video play ends. The target terminal determines whether updated AR stream data corresponding to any video frame exists in a played video frame sequence, and if the updated AR stream data exists, it indicates that the AR stream data corresponding to the video frame sequence is changed, and the target terminal needs to compress the updated AR stream data corresponding to the video frames to obtain the updated AR stream data corresponding to the video frame sequence.

In an embodiment, in a case that the AR data is a picture, when restoring and displaying the AR picture according to AR recognition data and virtual world data in additional information of the picture, the target terminal may further obtain an instruction triggered by a user for updating the displayed virtual world data, and display the updated virtual world data according to the updating instruction. A user can not only experience an AR scenario, but also update the virtual world data at the will of the user, thereby achieving the objective of secondary transformation of the AR picture.

Further, the target terminal may add the updated virtual world data to the additional information of the picture, and generate an updated AR picture according to the updated virtual world data and the AR recognition data in the additional information.

Figure 10:
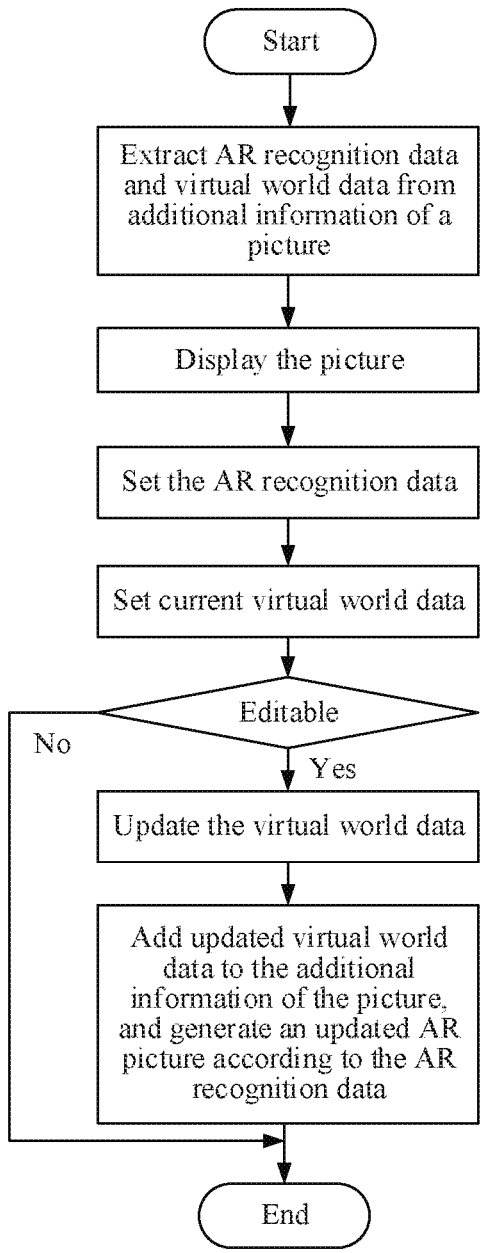
FIG. 10 is a schematic flowchart of restoring and transforming an AR scenario according to another embodiment.

FIG. 10 is a schematic flowchart of restoring and transforming an AR scenario according to an embodiment. Referring to FIG. 10, after receiving an AR picture, the target terminal extracts augmented AR recognition data and corresponding virtual world data from additional information of the picture, displays the picture according to image data of the picture, overlays the extracted virtual world data on the currently displayed picture according to the extracted augmented AR recognition data, and restores an AR scenario indicated by the AR picture. If the current picture is editable, when obtaining an editing instruction of a user, the target terminal may further update the overlaid virtual world data according to the editing instruction of the user, and add the updated virtual world data and the AR recognition data to the additional information of the picture, to generate an updated AR picture, thereby achieving the objective of transforming the AR scenario.

In this embodiment, the target terminal not only can restore the AR scenario acquired by the acquisition terminal, but also can implement the secondary transformation of the AR scenario by modifying the virtual world data in the displayed AR scenario.

S210. The target terminal shares the updated AR data.

In an embodiment, the target terminal may further generate updated AR data according to AR recognition data, a reality scenario image, and updated virtual world data in the received AR data, and share the updated AR data to the acquisition terminal or other target terminals.

In an embodiment, step S210 of that the target terminal shares the updated AR data specifically includes that: the first target terminal sends the updated AR data to the acquisition terminal; the acquisition terminal may receive the updated AR data fed back by the first target terminal; extract a reality scenario image from the updated AR data; recognize AR recognition data and updated virtual world data according to the reality scenario image; and overlay-display the updated virtual world data on the extracted reality scenario image according to the extracted AR recognition data.

Optionally, the first target terminal may also transmit updated AR data to any second target terminal other than the first target terminal, so that the second target terminal can perform a display operation performed by the acquisition terminal. Details are not described herein.

Specifically, after the first target terminal sends a picture added with the virtual world data and the AR recognition data to the second target terminal, the second target terminal may restore and display the AR scenario, and the second target terminal may further obtain an instruction of a user for updating the displayed virtual world data, obtain updated virtual world data according to the instruction, and display the updated virtual world data on a screen.

The second target terminal may further add the updated virtual world data and the obtained AR recognition data to the additional information of the picture to generate updated AR data and feed the updated AR data back to the acquisition terminal. The acquisition terminal may extract a reality scenario image, AR recognition data, and updated virtual world data from the received AR data, overlay the updated virtual world data on the reality scenario image, and then display the updated virtual world data, thereby implementing an interaction between the user corresponding to the acquisition terminal and the user corresponding to the second target terminal.

In an embodiment, step S210 of that the target terminal shares the updated AR data includes that: the target terminal generating the updated AR data may share the updated AR data to another target terminal, the updated AR data being used for instructing the target terminal receiving the updated AR data to extract a reality scenario image, AR recognition data, and updated virtual world data from the AR data, and overlay-display the updated virtual world data on the extracted reality scenario image according to the extracted AR recognition data.

Specifically, the target terminal may propagate the updated AR data to the another target terminal. Certainly, the target terminal may also propagate the updated AR data to the acquisition terminal, and the target terminal may further propagate the AR data that is propagated locally and that has not been updated to the another target terminal. After receiving the updated AR data, the another target terminal may similarly extract a reality scenario image, AR recognition data, and updated virtual world data from the AR data propagated locally to restore the AR scenario. Therefore, interactions between a plurality of users can be implemented based on the AR scenario.

In an embodiment, the AR data propagation method further includes the following steps: the target terminal obtains comment information corresponding to the displayed updated virtual world data, and display the comment information in real time.

Specifically, the first target terminal shares updated AR data, and the another target terminal may display the updated AR data, obtain comment information uploaded by a user for the displayed AR data, and send the obtained comment information to the target terminal in real time. The first target terminal may display the received comment information together when displaying an AR scenario indicated by the AR data.

In an embodiment, when displaying the updated AR data, the another target terminal may further obtain comment information of users for the displayed AR data and display the updated AR data. That is, both the target terminal generating the updated AR data and the target terminal receiving the updated AR data may obtain comment information of the users and display the comment information to the current user, thereby promoting interactions of a plurality of users based on the AR data.

In the AR data propagation method, after AR data sent by an acquisition terminal is received, the received AR data may be further sent to a target terminal with a relatively low configuration. In this way, the target terminal may display the AR data according to AR recognition data carried in the received AR data, and restore an AR scenario. The target terminal may further receive a user instruction, update the AR data in response to the user instruction, and then share the updated AR data, so that a user can experience, through the target terminal with the relatively low configuration, an AR scenario shot by the user corresponding to the acquisition terminal, thereby implementing AR interactions between a plurality of users.

Figure 11:
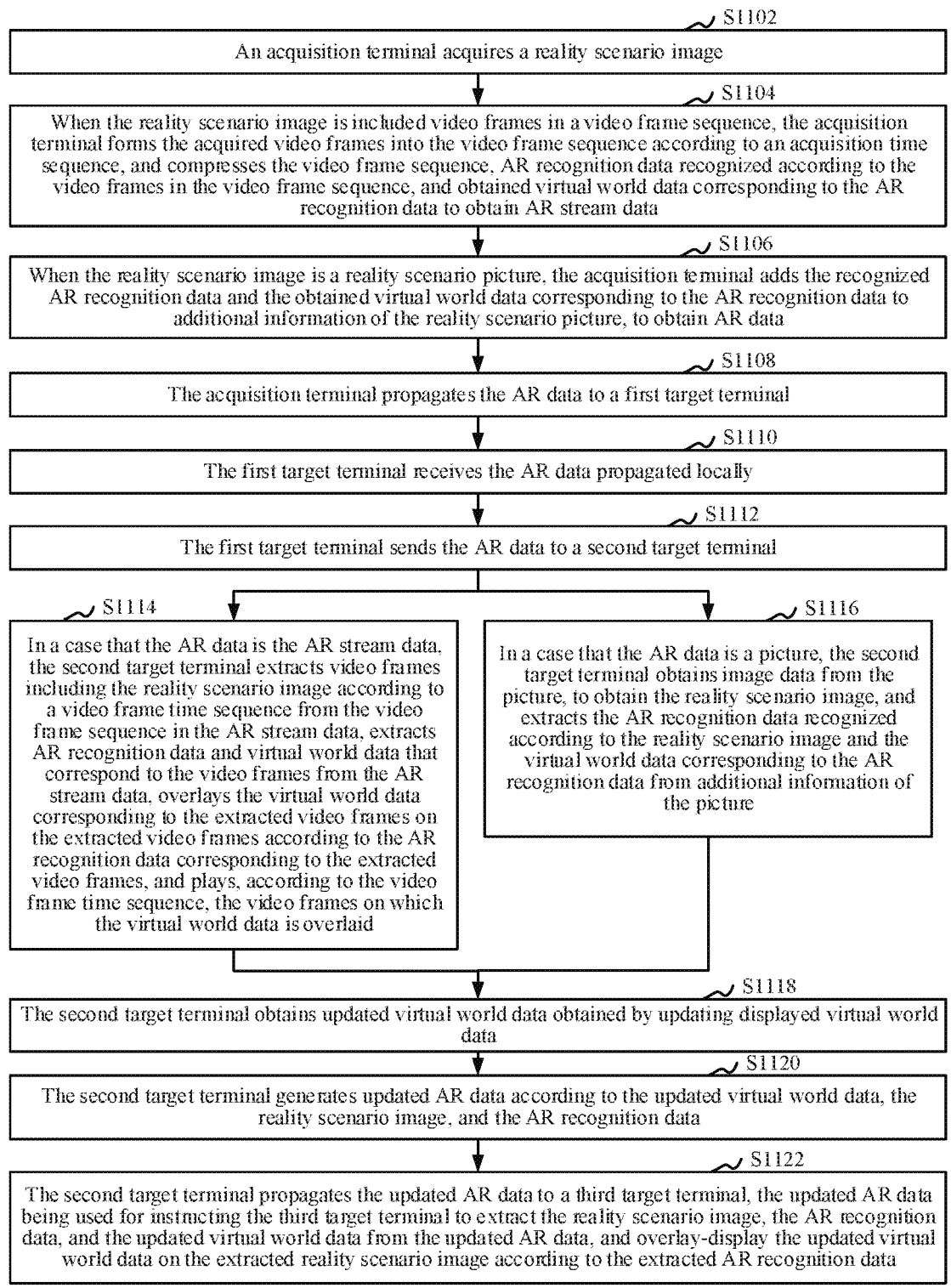
FIG. 11 is a schematic flowchart of an AR data propagation method according to a specific embodiment.

As shown in FIG. 11, in a specific embodiment, an AR data propagation method is provided. The method specifically includes the following steps:

S1102. An acquisition terminal acquires a reality scenario image.

S1104. In a case that the reality scenario image includes video frames in a video frame sequence, the acquisition terminal forms acquired video frames into a video frame sequence according to an acquisition time sequence, and compresses the video frame sequence, AR recognition data recognized according to the video frames in the video frame sequence, and obtained virtual world data corresponding to the AR recognition data, to obtain AR stream data.

S1106. In a case that the reality scenario image is a reality scenario picture, the acquisition terminal adds the recognized AR recognition data and the obtained virtual world data corresponding to the AR recognition data to additional information of the reality scenario picture, to obtain AR data.

S1108. The acquisition terminal propagates the AR data to a first target terminal.

S1110. The first target terminal receives the AR data propagated locally.

S1112. The first target terminal sends the AR data to a second target terminal.

S1114. In a case that the AR data is the AR stream data, the second target terminal extracts video frames including the reality scenario image according to a video frame time sequence from the video frame sequence in the AR stream data, extracts AR recognition data and virtual world data that correspond to the video frames from the AR stream data, overlays the virtual world data corresponding to the extracted video frames on the extracted video frames according to the AR recognition data corresponding to the extracted video frames, and plays, according to the video frame time sequence, the video frames on which the virtual world data is overlaid.

S1116. In a case that the AR data is a picture, the second target terminal obtains image data from the picture, to obtain the reality scenario image, and extracts the AR recognition data recognized according to the reality scenario image and the virtual world data corresponding to the AR recognition data from additional information of the picture.

S1118. The second target terminal obtains updated virtual world data obtained by updating displayed virtual world data.

S1120. The second target terminal generates updated AR data according to the updated virtual world data, the reality scenario image, and the AR recognition data.

S1122. The second target terminal propagates the updated AR data to a third target terminal, the updated AR data being used for instructing the third target terminal to extract the reality scenario image, the AR recognition data, and the updated virtual world data from the updated AR data, and overlay-display the updated virtual world data on the extracted reality scenario image according to the extracted AR recognition data.

In the AR data propagation method, after AR data sent by an acquisition terminal is received, the received AR data may be further sent to a target terminal with a relatively low configuration. In this way, the target terminal may display the AR data according to AR recognition data carried in the received AR data, and restore an AR scenario. The target terminal may further receive a user instruction, update the AR data in response to the user instruction, and then share the updated AR data, so that a user can experience, through the target terminal with the relatively low configuration, an AR scenario shot by the user corresponding to the acquisition terminal, thereby implementing AR interactions between a plurality of users.

FIG. 11 is a schematic flowchart of an AR data propagation method according to an embodiment. It is to be understood that although the steps in the flowchart of FIG. 11 are sequentially displayed in accordance with instructions of arrows, these steps are not necessarily performed sequentially in the order indicated by the arrows. Unless explicitly specified in this application, the sequence of the steps is not strictly limited, and the steps may be performed in other sequences. Moreover, at least some of the steps in FIG. 11 may include a plurality of sub-steps or a plurality of stages. These sub-steps or stages are not necessarily performed at the same moment, but may be performed at different times. These sub-steps or stages are not necessarily executed sequentially, but may be performed with at least one part of the other steps or sub-steps of other steps or stages in turn.

Figure 12:
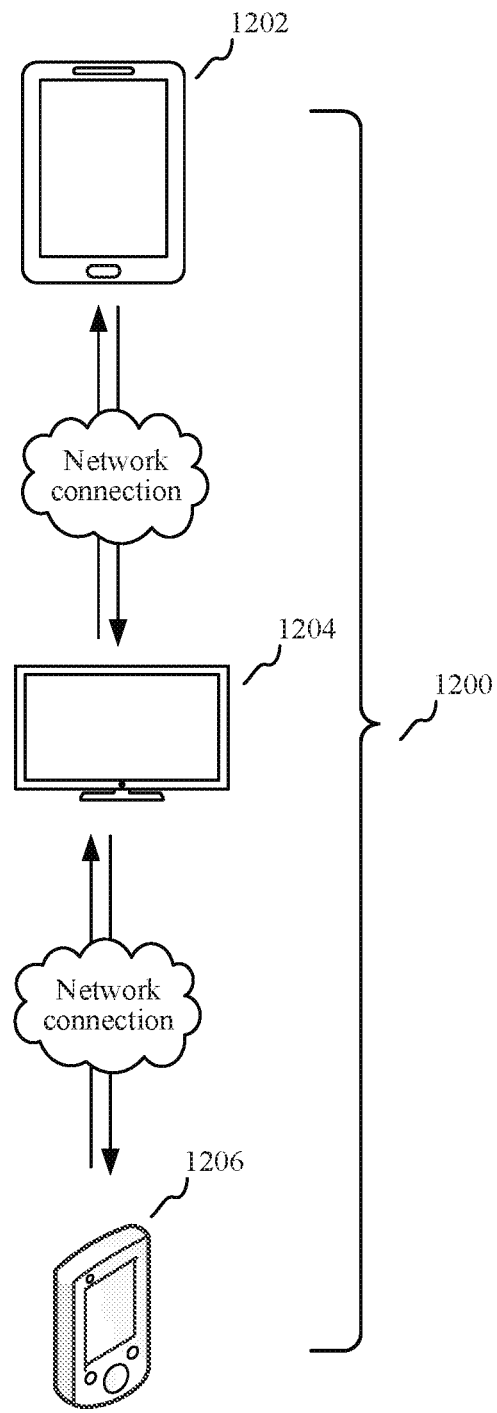
FIG. 12 is a schematic architectural diagram of an AR data propagation system according to an embodiment.

As shown in FIG. 12, in an embodiment, an AR data propagation system 1200 is provided. The AR data propagation system 1200 specifically includes an acquisition terminal 1202, a first target terminal 1204, a second target terminal 1206, and a third target terminal 1208.

The first target terminal 1204 is configured to receive AR data, the AR data carrying AR recognition data, and transmit the AR data to the second target terminal 1206.

The second target terminal 1206 is configured to display the AR data according to the AR recognition data, is further configured to receive a user instruction and update the AR data according to the user instruction, and is further configured to share the updated AR data.

In an embodiment, the acquisition terminal 1202 is configured to acquire a reality scenario image, recognize AR recognition data according to the reality scenario image, obtain virtual world data corresponding to the AR recognition data, and generate AR data according to the reality scenario image, the AR recognition data, and the virtual world data; and is further configured to propagate the AR data to the first target terminal 1204.

In an embodiment, in a case that the reality scenario image includes video frames in a video frame sequence, the AR data is AR stream data, and the AR stream data includes the video frame sequence and further includes AR recognition data corresponding to the video frames in the video frame sequence and virtual world data corresponding to the corresponding AR recognition data.

In an embodiment, the acquisition terminal 1202, the first target terminal 1204, or the second target terminal 1206 is further configured to overlay, in a case that the video frames in the video frame sequence are played according to an order of the video frame sequence, corresponding virtual world data on the corresponding video frames according to the corresponding AR recognition data for play.

In an embodiment, the acquisition terminal 1202 is further configured to acquire video frames from a reality scenario frame by frame, form the video frames into a video frame sequence according to an acquisition time sequence, recognize the corresponding AR recognition data according to the video frames in the video frame sequence, and compress the video frame sequence, the AR recognition data, and the virtual world data, to obtain the AR stream data.

In an embodiment, in a case that the reality scenario image is a reality scenario picture, the AR data is a picture; and the acquisition terminal 1202 is further configured to add the AR recognition data and the virtual world data to additional information of the reality scenario picture, to obtain the AR data.

In an embodiment, the acquisition terminal 1202 is further configured to obtain an image acquisition instruction, acquire an image of a reality scenario in real time according to the image acquisition instruction, recognize AR recognition data according to the image, and acquire the reality scenario image in a case that the recognized AR recognition data meets a preset condition.

In an embodiment, the acquisition terminal 1202 is further configured to receive updated AR data fed back by a target terminal, the target terminal being at least one of the first target terminal 1204, the second target terminal 1206, and the third target terminal 1208, and the acquisition terminal 1202 is further configured to extract a reality scenario image, AR recognition data, and updated virtual world data from the updated AR data, and overlay-display the updated virtual world data on the extracted reality scenario image according to the extracted AR recognition data.

In an embodiment, the second target terminal 1206 is further configured to extract a reality scenario image, AR recognition data recognized according to the reality scenario image, and virtual world data corresponding to the AR recognition data from the AR data, overlay the virtual world data on the reality scenario image according to the AR recognition data, and display the reality scenario image on which the virtual world data is overlaid.

In an embodiment, the second target terminal 1206 is further configured to extract video frames including the reality scenario image according to a video frames time sequence from a video frame sequence in the AR stream data, and extract AR recognition data and virtual world data that correspond to the video frames from the AR stream data, the AR recognition data corresponding to the virtual world data.

In an embodiment, the second target terminal 1206 is further configured to overlay the virtual world data corresponding to the extracted video frames on the extracted video frames according to the AR recognition data corresponding to the extracted video frame, and play, according to the video frame time sequence, the video frames on which the virtual world data is overlaid.

In an embodiment, in a case that the AR data is a picture, the second target terminal 1206 is further configured to obtain image data from the picture, to obtain a reality scenario image, and extract AR recognition data recognized according to the reality scenario image and virtual world data corresponding to the AR recognition data from additional information of the picture.

In an embodiment, the second target terminal 1206 is further configured to obtain a user instruction triggered by a user for updating displayed virtual world data, obtain updated virtual world data corresponding to the user instruction, and generate updated AR data according to the updated virtual world data, the reality scenario image, and the AR recognition data.

In an embodiment, the third target terminal 1208 is further configured to extract, in response to receiving the updated AR data shared by the second target terminal 1206, a reality scenario image, AR recognition data, and updated virtual world data from the updated AR data, and overlay-display the updated virtual world data on the extracted reality scenario image according to the extracted AR recognition data.

In an embodiment, the second target terminal 1206 is further configured to obtain comment information corresponding to the displayed updated virtual world data, and display the comment information in real time.

According to the AR data propagation system 1200, after AR data sent by an acquisition terminal is received, the received AR data may be further sent to a target terminal with a relatively low configuration. In this way, the target terminal may display the AR data according to AR recognition data carried in the received AR data, and restore an AR scenario. The target terminal may further receive a user instruction, update the AR data in response to the user instruction, and then share the updated AR data, so that a user can experience, through the target terminal with the relatively low configuration, an AR scenario shot by the user corresponding to the acquisition terminal, thereby implementing AR interactions between a plurality of users.

In an embodiment, a non-transitory computer-readable storage medium is provided, storing a computer program. The computer program, when executed by a processor, causes the processor to perform the following steps: receiving AR data, the AR data carrying AR recognition data, displaying the AR data according to the AR recognition data, updating, in response to receiving a user instruction, the AR data according to the user instruction, and sharing updated AR data.

In an embodiment, the computer program, when executed by the processor, further causes the processor to perform the following steps: acquiring a reality scenario image, recognizing AR recognition data according to the reality scenario image, obtaining virtual world data corresponding to the AR recognition data, and generating AR data according to the reality scenario image, the AR recognition data, and the virtual world data.

In an embodiment, in a case that the reality scenario image includes video frames in a video frame sequence, the AR data is AR stream data, and the AR stream data includes the video frame sequence and further includes AR recognition data corresponding to the video frames in the video frame sequence and virtual world data corresponding to the corresponding AR recognition data.

In an embodiment, the AR stream data is used for instructing a target terminal to overlay, in a case of playing the video frames in the video frame sequence according to an order of the video frame sequence, the corresponding virtual world data on the corresponding video frames according to the corresponding AR recognition data for play.

In an embodiment, the computer program, when executed by the processor to perform the step of acquiring a reality scenario image, causes the processor to specifically perform the following steps: acquiring video frames from a reality scenario frame by frame, and forming the video frames into a video frame sequence according to an acquisition time sequence. The computer program, when executed by the processor to perform the step of obtaining AR recognition data corresponding to the reality scenario image, causes the processor to specifically perform the following step: recognizing the corresponding AR recognition data according to the video frames in the video frame sequence. The computer program, when executed by the processor to perform the step of generating AR data according to the reality scenario image, the AR recognition data, and the virtual world data, causes the processor to specifically perform the following step: compressing the video frame sequence, the AR recognition data, and the virtual world data, to obtain the AR stream data.

In an embodiment, in a case that the reality scenario image is a reality scenario picture, the AR data is a picture; and the computer program, when executed by the processor to perform the step of generating AR data according to the reality scenario image, the AR recognition data, and virtual world data, causes the processor to specifically perform the following step: adding the AR recognition data and the virtual world data into additional information of the reality scenario picture, to obtain the AR data.

In an embodiment, the computer program, when executed by the processor to the step of acquiring a reality scenario image, causes the processor to specifically perform the following steps: obtaining an image acquisition instruction, acquiring an image of a reality scenario in real time according to the image acquisition instruction, recognizing AR recognition data according to the image, and acquiring a reality scenario image in a case that the recognized AR recognition data meets a preset condition.

In an embodiment, the computer program, when executed by the processor, causes the processor to specifically perform the following steps: receiving updated AR data fed back by a target terminal, extracting a reality scenario image, AR recognition data recognized according to the reality scenario image, and updated virtual world data from the updated AR data, and overlay-displaying the updated virtual world data on the extracted reality scenario image according to the extracted AR recognition data.

In an embodiment, the computer program, when executed by the processor to perform the step of displaying the AR data in the target terminal according to the AR recognition data, causes the processor to specifically perform the following steps: extracting a reality scenario image, AR recognition data recognized according to the reality scenario image, and virtual world data corresponding to the AR recognition data from the AR data, overlaying the virtual world data on the reality scenario image according to the AR recognition data, and displaying the reality scenario image on which the virtual world data is overlaid.

In an embodiment, in a case that the AR data is AR stream data, the computer program, when executed by the processor to perform the step of extracting a reality scenario image, AR recognition data recognized according to the reality scenario image, and virtual world data corresponding to the AR recognition data from the AR data, causes the processor to specifically perform the following steps: extracting video frames including the reality scenario image according to a video frame time sequence from a video frame sequence in the AR stream data, and extracting AR recognition data and virtual world data that correspond to the video frames from the AR stream data, the AR recognition data corresponding to the virtual world data.

In an embodiment, in a case that the AR data is AR stream data, the computer program, when executed by the processor to perform the step of overlaying the virtual world data on the reality scenario image according to the AR recognition data, causes the processor to specifically perform the following step: overlaying the virtual world data corresponding to the extracted video frames on the extracted video frames according to the AR recognition data corresponding to the extracted video frames. The computer program, when executed by the processor to perform the step of displaying the reality scenario image on which the virtual world data is overlaid, causes the processor to specifically perform the following step: playing, according to the video frame time sequence, the video frames on which the virtual world data is overlaid.

In an embodiment, in a case that the AR data is a picture, the computer program, when executed by the processor to perform the step of extracting a reality scenario image, AR recognition data recognized according to the reality scenario image, and virtual world data corresponding to the AR recognition data from the AR data, causes the processor to specifically perform the following steps: obtaining image data from the picture to obtain the reality scenario image, and extracting the AR recognition data recognized according to the reality scenario image and the virtual world data corresponding to the AR recognition data from additional information of the picture.

In an embodiment, the computer program, when executed by the processor to perform the step of receiving a user instruction and updating AR data according to the user instruction, causes the processor to specifically perform the following steps: obtaining a user instruction triggered by a user for updating displayed virtual world data, obtaining updated virtual world data corresponding to the user instruction, and generating updated AR data according to the updated virtual world data, the reality scenario image, and the AR recognition data.

In an embodiment, the updated AR data is used for instructing a terminal receiving the updated AR data to extract the reality scenario image, the AR recognition data, and the updated virtual world data from the updated AR data, and overlay-display the updated virtual world data on the extracted reality scenario image according to the extracted AR recognition data.

In an embodiment, the computer program, when executed by the processor, causes the processor to specifically perform the following steps: obtaining comment information corresponding to the displayed updated virtual world data, and displaying the comment information in real time.

In an embodiment, the AR recognition data includes at least one of positioning map information, plane information, light sensing information, or facial information.

According to the non-transitory computer-readable storage medium, after AR data sent by an acquisition terminal is received, the received AR data may be further sent to a target terminal with a relatively low configuration. In this way, the target terminal may display the AR data according to AR recognition data carried in the received AR data, and restore an AR scenario. The target terminal may further receive a user instruction, update the AR data in response to the user instruction, and then share the updated AR data, so that a user can experience, through the target terminal with the relatively low configuration, an AR scenario shot by the user corresponding to the acquisition terminal, thereby implementing AR interactions between a plurality of users.

In an embodiment, a terminal is provided, including a memory and a processor, the memory storing a computer program, the computer program, when executed by the processor, causing the processor to perform the following steps: receiving AR data, the AR data carrying AR recognition data, displaying the AR data according to the AR recognition data, updating, in response to receiving a user instruction, the AR data according to the user instruction, and sharing updated AR data.

In an embodiment, the computer program, when executed by the processor, further causes the processor to perform the following steps: acquiring a reality scenario image, recognizing AR recognition data according to the reality scenario image, obtaining virtual world data corresponding to the AR recognition data, and generating AR data according to the reality scenario image, the AR recognition data, and the virtual world data.

In an embodiment, in a case that the reality scenario image includes video frames in a video frame sequence, the AR data is AR stream data, and the AR stream data includes the video frame sequence and further includes AR recognition data corresponding to the video frames in the video frame sequence and virtual world data corresponding to the corresponding AR recognition data.

In an embodiment, the AR stream data is used for instructing a target terminal to overlay, in a case of playing the video frames in the video frame sequence according to an order of the video frame sequence, the corresponding virtual world data on the corresponding video frames according to the corresponding AR recognition data for play.

In an embodiment, the computer program, when being executed by the processor to perform the step of acquiring a reality scenario image, causes the processor to specifically perform the following steps: acquiring video frames from a reality scenario frame by frame, and forming the video frames into a video frame sequence according to an acquisition time sequence. The computer program, when being executed by the processor to perform a step of obtaining AR recognition data corresponding to the reality scenario image, causes the processor to specifically perform the following step: recognizing the corresponding AR recognition data according to the video frames in the video frame sequence. The computer program, when executed by the processor to perform a step of generating AR data according to the reality scenario image, the AR recognition data, and the virtual world data, causes the processor to specifically perform the following step: compressing the video frame sequence, the AR recognition data, and the virtual world data, to obtain the AR stream data.

In an embodiment, in a case that the reality scenario image is a reality scenario picture, the AR data is a picture; and the computer program, when executed by the processor to perform the step of generating AR data according to the reality scenario image, the AR recognition data, and virtual world data, causes the processor to specifically perform the following step: adding the AR recognition data and the virtual world data into additional information of the reality scenario picture, to obtain the AR data.

In an embodiment, the computer program, when being executed by the processor to the step of acquiring a reality scenario image, causes the processor to specifically perform the following steps: obtaining an image acquisition instruction, acquiring an image of a reality scenario in real time according to the image acquisition instruction, recognizing AR recognition data according to the image, and acquiring a reality scenario image in a case that the recognized AR recognition data meets a preset condition.

In an embodiment, the computer program, when executed by the processor, causes the processor to specifically perform the following steps: receiving updated AR data fed back by a target terminal, extracting a reality scenario image, AR recognition data recognized according to the reality scenario image, and updated virtual world data from the updated AR data, and overlay-displaying the updated virtual world data on the extracted reality scenario image according to the extracted AR recognition data.

In an embodiment, the computer program, when being executed by the processor to perform the step of displaying the AR data in the target terminal according to the AR recognition data, causes the processor to specifically perform the following steps: extracting a reality scenario image, AR recognition data recognized according to the reality scenario image, and virtual world data corresponding to the AR recognition data from the AR data, overlaying the virtual world data on the reality scenario image according to the AR recognition data, and displaying the reality scenario image on which the virtual world data is overlaid.

In an embodiment, in a case that the AR data is AR stream data, the computer program, when executed by the processor to perform the step of extracting a reality scenario image, AR recognition data recognized according to the reality scenario image, and virtual world data corresponding to the AR recognition data from the AR data, causes the processor to specifically perform the following steps: extracting video frames including the reality scenario image, according to a video frames time sequence from a video frame sequence in the AR stream data, and extracting AR recognition data and virtual world data that correspond to the video frames from the AR stream data, the AR recognition data corresponding to the virtual world data.

In an embodiment, in a case that the AR data is AR stream data, the computer program, when being executed by the processor to perform the step of overlaying the virtual world data on the reality scenario image according to the AR recognition data, causes the processor to specifically perform the following step: overlaying the virtual world data corresponding to the extracted video frames on the extracted video frames according to the AR recognition data corresponding to the extracted video frame. The computer program, when executed by the processor to perform the step of displaying the reality scenario image on which the virtual world data is overlaid, causes the processor to specifically perform the following step: playing, according to the video frame time sequence, the video frames on which the virtual world data is overlaid.

In an embodiment, in a case that the AR data is a picture, the computer program, when executed by the processor to perform the step of extracting a reality scenario image, AR recognition data recognized according to the reality scenario image, and virtual world data corresponding to the AR recognition data from the AR data, causes the processor to specifically perform the following steps: obtaining image data from the picture to obtain the reality scenario image, and extracting the AR recognition data recognized according to the reality scenario image and the virtual world data corresponding to the AR recognition data from additional information of the picture.

In an embodiment, the computer program, when being executed by the processor to perform the step of receiving a user instruction and updating AR data according to the user instruction, causes the processor to specifically perform the following steps: obtaining a user instruction triggered by a user for updating displayed virtual world data, obtaining updated virtual world data corresponding to the user instruction, and generating updated AR data according to the updated virtual world data, the reality scenario image, and the AR recognition data.

In an embodiment, the updated AR data is used for instructing a terminal receiving the updated AR data to extract the reality scenario image, the AR recognition data, and the updated virtual world data from the updated AR data, and overlay-display the updated virtual world data on the extracted reality scenario image according to the extracted AR recognition data.

In an embodiment, the computer program, when executed by the processor, causes the processor to specifically perform the following steps: obtaining comment information corresponding to the displayed updated virtual world data, and displaying the comment information in real time.

In an embodiment, the AR recognition data includes at least one of positioning map information, plane information, light sensing information, or facial information.

A person of ordinary skill in the art may understand that all or some of the processes in the method of the foregoing embodiments may be implemented and completed by using the computer programs to instruct related hardware. The programs may be stored in a non-transitory computer-readable storage medium, and the programs, when executed, may include the processes of the foregoing method embodiments. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in various forms, such as a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchronous link (Synchlink) DRAM (SLDRAM), a Rambus Direct RAM (RDRAM), a Direct Rambus Dynamic RAM (DRDRAM), and a Rambus Dynamic RAM (DRAM).

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only describe several implementations of this application, and are described in detail, but they are not to be construed as a limitation to the patent scope of this application. A person of ordinary skill in the art may further make variations and improvements without departing from the ideas of this application, which all fall within the protection scope of this application. Therefore, the protection scope of the patent of this application shall be subject to the appended claims.

What is claimed is:

1. A method of processing augmented reality (AR) data at a terminal having a processor and memory storing a plurality of programs to be executed by the processor, the method comprising:
    receiving AR data, the AR data carrying a reality scenario image, AR recognition data corresponding to the reality scenario image and virtual world data corresponding to the AR recognition data, the AR data being generated by an acquisition terminal;
    displaying the AR data by overlay-displaying the virtual world data on the reality scenario image according to the AR recognition data;
    in response to receiving a user instruction, updating the AR data according to the user instruction, further including:
        updating the virtual world data according to the user instruction to obtain updated virtual world data; and
        generating the updated AR data according to the reality scenario image, the updated virtual world data, and the AR recognition data; and
    sharing the updated AR data with a target terminal, wherein the updated AR data is used for instructing the target terminal to extract the reality scenario image, the AR recognition data, and the updated virtual world data from the updated AR data and overlay-display the updated virtual world data on the extracted reality scenario image according to the extracted AR recognition data.

2. The method according to claim 1, wherein the acquisition terminal generates the AR data by:
    acquiring the reality scenario image;
    recognizing the AR recognition data according to the reality scenario image;
    obtaining the virtual world data corresponding to the AR recognition data; and
    generating the AR data according to the reality scenario image, the AR recognition data, and the virtual world data.

3. The method according to claim 2, wherein in a case that the reality scenario image comprises video frames in a video frame sequence, the AR data is AR stream data, and the AR stream data comprises the video frame sequence and further comprises AR recognition data corresponding to the video frames in the video frame sequence and virtual world data corresponding to the corresponding AR recognition data.

4. The method according to claim 3, wherein the method further comprises:
  overlaying, in a case that the video frames in the video frame sequence are played according to an order of the video frame sequence, the corresponding virtual world data on the corresponding video frames according to the corresponding AR recognition data for play.

5. The method according to claim 3, wherein the acquiring a reality scenario image comprises:
  acquiring video frames from a reality scenario frame by frame, and forming the video frames into a video frame sequence according to an acquisition time sequence;
  the recognizing the AR recognition data according to the reality scenario image comprises:
  recognizing the corresponding AR recognition data according to the video frames in the video frame sequence; and
  the generating the AR data according to the reality scenario image, the AR recognition data, and the virtual world data comprises:
  compressing the video frame sequence, the AR recognition data, and the virtual world data, to obtain the AR stream data.

6. The method according to claim 2, wherein in a case that the reality scenario image is a reality scenario picture, the AR data is a picture; and
  the generating the AR data according to the reality scenario image, the AR recognition data, and the virtual world data comprises:
  adding the AR recognition data and the virtual world data to additional information of the reality scenario picture, to obtain the AR data.

7. The method according to claim 6, wherein the acquiring a reality scenario image comprises:
  obtaining an image acquisition instruction;
  acquiring an image of a reality scenario in real time according to the image acquisition instruction;
  recognizing AR recognition data according to the image; and
  acquiring the reality scenario image in a case that the recognized AR recognition data meets a preset condition.

8. The method according to claim 1, wherein the sharing the updated AR data with a target terminal further comprises:
  transmitting the AR data to the target terminal;
  receiving updated AR data returned by the target terminal;
  extracting a reality scenario image, AR recognition data recognized according to the reality scenario image, and updated virtual world data from the updated AR data; and
  overlay-displaying the updated virtual world data on the extracted reality scenario image according to the extracted AR recognition data.

9. The method according to claim 1, wherein the displaying the AR data according to the AR recognition data comprises:
  extracting a reality scenario image, AR recognition data recognized according to the reality scenario image, and virtual world data corresponding to the AR recognition data from the AR data;
  overlaying the virtual world data on the reality scenario image according to the AR recognition data; and
  displaying the reality scenario image on which the virtual world data is overlaid.

10. The method according to claim 9, wherein in a case that the AR data is AR stream data, the extracting a reality scenario image, AR recognition data recognized according to the reality scenario image, and virtual world data corresponding to the AR recognition data from the AR data comprises:
  extracting video frames comprising the reality scenario image according to a video frame time sequence from a video frame sequence in the AR stream data; and
  extracting AR recognition data and virtual world data that correspond to the video frames from the AR stream data, the AR recognition data corresponding to the virtual world data.

11. The method according to claim 10, wherein the overlaying the virtual world data on the reality scenario image according to the AR recognition data comprises:
  overlaying the virtual world data corresponding to the extracted video frames on the extracted video frames according to the AR recognition data corresponding to the extracted video frames; and
  the displaying the reality scenario image on which the virtual world data is overlaid comprises:
  playing, according to the video frame time sequence, the video frames on which the virtual world data is overlaid.

12. The method according to claim 9, wherein in a case that the AR data is a picture, the extracting a reality scenario image, AR recognition data recognized according to the reality scenario image, and virtual world data corresponding to the AR recognition data from the AR data comprises:
  obtaining image data from the picture, to obtain the reality scenario image; and
  extracting the AR recognition data recognized according to the reality scenario image and the virtual world data corresponding to the AR recognition data from additional information of the picture.

13. The method according to claim 1, wherein the target terminal is configured to perform a plurality of operations including:
  obtaining, from the updated AR data, comment information corresponding to the updated virtual world data; and
  displaying the comment information in real time.

14. The method according to claim 1, wherein the AR recognition data comprises at least one of positioning map information, plane information, light sensing information, or facial information.

15. A terminal, comprising a processor and a memory, the memory storing at least one instruction, and the instruction being loaded and executed by the processor to perform a plurality of instructions including:
  receiving AR data, the AR data carrying a reality scenario image, AR recognition data corresponding to the reality scenario image and virtual world data corresponding to the AR recognition data, the AR data being generated by an acquisition terminal;
  displaying the AR data by overlay-displaying the virtual world data on the reality scenario image according to the AR recognition data;
  in response to receiving a user instruction, updating the AR data according to the user instruction, further including:
    updating the virtual world data according to the user instruction to obtain updated virtual world data; and generating the updated AR data according to the reality scenario image, the updated virtual world data, and the AR recognition data; and sharing the updated AR data with a target terminal, wherein the updated AR data is used for instructing the target terminal to extract the reality scenario image, the AR recognition data, and the updated virtual world data from the updated AR data and overlay-display the updated virtual world data on the extracted reality scenario image according to the extracted AR recognition data.

16. The terminal according to claim 14, wherein the acquisition terminal generates the AR data by:

acquiring the reality scenario image;

recognizing the AR recognition data according to the reality scenario image;

obtaining the virtual world data corresponding to the AR recognition data; and generating the AR data according to the reality scenario image, the AR recognition data, and the virtual world data.

17. The terminal according to claim 14, wherein the displaying the AR data according to the AR recognition data comprises:

extracting a reality scenario image, AR recognition data recognized according to the reality scenario image, and virtual world data corresponding to the AR recognition data from the AR data;

overlaying the virtual world data on the reality scenario image according to the AR recognition data; and displaying the reality scenario image on which the virtual world data is overlaid.

18. A non-transitory computer-readable storage medium, the storage medium storing a plurality of computer programs, and the computer programs, when executed by a processor of a terminal, causing the terminal to perform a plurality of instructions including:

receiving AR data, the AR data carrying a reality scenario image, AR recognition data corresponding to the reality scenario image and virtual world data corresponding to the AR recognition data, the AR data being generated by an acquisition terminal;

displaying the AR data by overlay-displaying the virtual world data on the reality scenario image according to the AR recognition data;

in response to receiving a user instruction, updating the AR data according to the user instruction, further including:

updating the virtual world data according to the user instruction to obtain updated virtual world data; and generating the updated AR data according to the reality scenario image, the updated virtual world data, and the AR recognition data; and sharing the updated AR data with a target terminal, wherein the updated AR data is used for instructing the target terminal to extract the reality scenario image, the AR recognition data, and the updated virtual world data from the updated AR data and overlay-display the updated virtual world data on the extracted reality scenario image according to the extracted AR recognition data.

19. The non-transitory computer-readable storage medium according to claim 18, wherein the acquisition terminal generates the AR data by:

acquiring the reality scenario image;

recognizing the AR recognition data according to the reality scenario image;

obtaining the virtual world data corresponding to the AR recognition data; and generating the AR data according to the reality scenario image, the AR recognition data, and the virtual world data.

\* \* \* \* \*